Sept. 18, 1951  C. W. STAACKE  2,568,174
CONVEYER BELT SUPPORT
Filed June 25, 1948
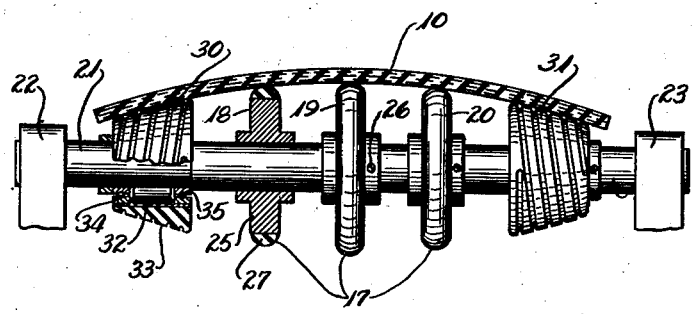
_Fig-2_
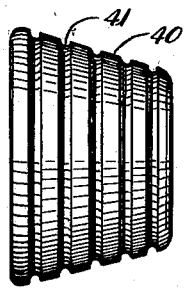
_Fig-3_
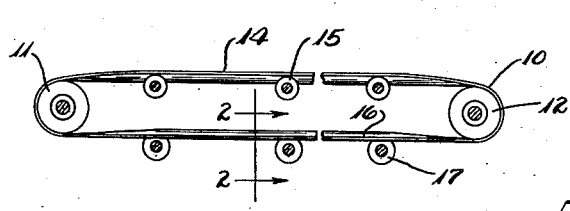
_Fig-1_
Inventor
Charles W. Staacke
By
Atty Patented Sept. 18, 1951

2,568,174

UNITED STATES PATENT OFFICE 2,568,174

CONVEYER BELT SUPPORT

Charles W. Staacke, Akron, Ohio, assignor to The B. F. Goodrich Company, New York, N. Y., a corporation of New York Application June 25, 1948, Serial No. 35,197

6 Claims. (Cl. 198—202)

This invention relates to rotatable supports for conveyor belts and is especially useful in supporting a horizontal or inclined return reach of a conveyor belt.

Where conveyor belts have been used for transporting broken or crushed rock, coal, granular or powdered materials, the upper reach of the belt has been supported in troughed shape by groups of cylindrical idler rollers, and the return reach of the belt has been supported on flat faced cylindrical idler rollers. It has been found that the return reach of the belt tends to shift laterally causing its margins to contact edge guides and to wear rapidly due to contact therewith. Such lateral shifting has been found especially severe where powdered material has built up on the under side of the belt due to the presence of moisture, thereby providing an uneven surface for contact with the idlers.

It has been proposed to support the return reach of the belt upon a series of laterally spaced apart narrow faced rollers of equal diameter between which it was expected that the belt would flex laterally and thereby discharge accumulations of material on its under face but while some improvement in discharge of adherent material has resuled, it has also been found that the margins of the belt tend to flex downwardly between the narrow rollers thereby bringing a margin of the belt into contact with a side of a flanking roller with consequent wear and increased lateral flexing of the margin.

It is an object of the present invention to overcome the foregoing and other difficulties by providing a wide support for the belt at its margins while nevertheless providing for escape of adhered material at the center of the belt.

Other objects are to provide for support of the return reach of the belt in reversely troughed condition, to reduce lateral shifting of the belt, and to reduce wear of the belt.

These and other objects will appear from the following description and the accompanying drawings.

Of the drawings:

Fig. 1 is a side elevation of a conveyor belt and the supporting mechanism in which the supports for the return reach of the belt are constructed in accordance with and embodying the invention.

Fig. 2 is a sectional view thereof, taken on line 2—2 of Fig. 1 showing a set of supporting rollers, parts being broken away.

Fig. 3 is a face view of a modification of one of the end rollers.

Referring to the drawings, the numeral 10 designates a conveyor belt trained about pulleys 11, 12, one of which may be the driver. The upper or material supporting reach 14 of the belt, is supported at intervals therealong by troughing idlers 15. The lower or return reach 16 is supported at intervals therealong by reverse troughing idlers 17 corresponding to the invention and shown in Fig. 2.

Each of the reverse troughing idlers 17 comprises a series of narrow rollers 18, 19, 20 arranged in spaced apart relation on a supporting shaft 21 rotatably mounted in bearings 22, 23. The roller 19, at the center of the belt is larger in diameter than the rollers 18, 20 to support the center of the belt in reversely troughed condition. Each of the rollers 18, 19, 20 has a web 25 of rigid material such as metal, which is secured to the shaft 21 as by a set-screw 26, and a resilient tread 27 of vulcanized rubber or other rubber-like material for contacting the belt. Preferably the treads of these rollers are of convex cross-section, as shown to provide a narrow contact with the belt. While three of the narrow rollers have been shown it will be understood that the number of rollers will depend upon the width of the belt and that more will be employed with very wide belts. The rollers are graduated in diameter from the center line of the belt toward each margin so as to support the belt at the desired lateral curvature.

For supporting the belt in the region of its lateral margins, a pair of wide faced conical rollers 30, 31 are employed, arranged with their smaller ends toward the margins of the belt and spaced inwardly thereof by at least one inch so that the margins of the belt overhang the rollers. Each of the rollers 30, 31 has a tubular hub 32 to which is secured a resilient tread 33 of rubber or other rubber-like material. The hub 32 is rotatably mounted about the shaft for free rotation, as by being mounted on ball bearings 34, 35. The treads of the conical rollers are usually about four or five inches wide so that should any shifting of the belt take place, the margins of the belt cannot flex downwardly to engage a radial surface of the rollers. The conical rollers are of such size and taper as to continue the desired curvature of reverse troughing The support of the return reach of the belt in reversely troughed condition tends to overcome any tendency for the belt to shift laterally in much the same manner as a crowned pulley tends to cause a belt thereon to run to the center. To break up the continuous contact of the conical rollers with the belt surface, the treads thereof may be formed with alternate circumferential ridges 40 and grooves 41 as shown in Fig. 3. The ridges are relatively close to each other and have inclined side faces so that the margin of the belt does not sink into one of the grooves. These ridges and grooves may be of helical formation as in Fig. 2 where the roller 30 has left hand ridges and grooves and the roller 31 has right hand ridges and grooves.

Where the weight of the belt upon the rolls is equal, the forces exerted on the belt by the inclined ribs and grooves will act in opposite directions and will equalize each other. As the large ends of the rollers will be driven at a higher surface speed than the small ends thereof some slippage between the rollers and the belt will occur resulting in a wiping action of the helical ribs relative to the surface of the belt and exerting a force tending to move the belt laterally toward the center of the belt as it passes thereover.

Should the belt run to one side the excess weight upon the roller at that side will cause a greater force to be exerted by that roller than by the opposite roller, tending to cause the belt to return to the center.

The reverse troughing of the belt on the return reach presents a convex upper surface so that material falling on the return reach will be shed to the sides and will not follow the belt around the drive pulleys, thereby avoiding damage to the belt by such material passing between the drive pulleys and the belt.

Variations may be made without departing from the scope of the invention as it is defined by the following claims.

I claim:

1. A support for the return reach of a belt, said support comprising a set of laterally spaced coaxially mounted rollers having resilient treads for contacting the lower face of the return reach of the belt for supporting it, the marginal rollers of said set having conical tread surfaces broader than the rollers therebetween, the rollers between said marginal rollers having faces convex in cross-section providing substantially line contact with the belt, and the treads of the rollers of a set collectively presenting an arcuate support for contact with the belt to support the belt in reversely troughed condition, said marginal rollers being spaced inwardly of the belt from its margins so that overhang of the margins of the belt is provided.

2. A support for the return reach of a belt, said support comprising a set of laterally spaced coaxially mounted rollers having resilient treads for contacting the lower face of the return reach of the belt for supporting it, the marginal rollers of said set having conical tread surfaces broader than the rollers therebetween, and the treads of the rollers of a set collectively presenting a convex contact with the belt to support the belt in reversely troughed condition, said marginal rollers having belt contacting surfaces comprising narrow substantially circumferential ribs separated by grooves.

3. A support for the return reach of a belt, said support comprising a set of laterally spaced coaxially mounted rollers having resilient treads for contacting the lower face of the return reach of the belt for supporting it, the marginal rollers of said set having conical tread surfaces broader than the rollers therebetween, the rollers between said marginal rollers having faces convex in cross-section providing substantially line contact with the belt, and the treads of the rollers of a set collectively presenting an arcuate support for contact with the belt to support the belt in reversely troughed condition, said marginal rollers being freely rotatable relative to the rollers therebetween.

4. A support for the return reach of a belt, said support comprising a set of laterally spaced coaxially mounted rollers having resilient treads for contacting the lower face of the return reach of the belt for supporting it, the marginal rollers of said set having conical tread surfaces broader than the rollers therebetween, and the treads of the rollers of a set collectively presenting a convex contact with the belt to support the belt in reversely troughed condition, said marginal rollers having belt contacting surfaces comprising narrow helical grooves, the ribs and grooves of one marginal roller being of opposite inclination to the ribs and grooves of the other marginal roller.

5. A support for the return reach of a troughed conveyor belt, said support comprising a set of laterally spaced coaxially mounted rollers having resilient treads for contacting the lower face of the return reach of the belt for supporting it, the marginal rollers of said set having conical tread surfaces broader than the rollers therebetween, and the treads of the rollers of a set collectively presenting a convex contact with the belt of a curvature supporting said reach in reversely troughed condition providing equal tensioning of the belt throughout its width, said marginal rollers having helically grooved treads of opposite hand at opposite margins of the belt and being spaced inwardly from the margins of the belt to provide overhang of the belt at its margins, and said marginal rollers being rotatable relative to the rollers therebetween.

6. A support for the return reach of a belt, said support comprising a rotatable shaft, a set of laterally spaced rollers coaxial of said shaft and supported thereby beneath the return reach of the belt, said shaft extending transversely of said return reach, the marginal rollers of said set being mounted for free rotation about said shaft in the regions of the margins of the belt and being generally conical in shape, the rollers intermediate said marginal rollers having tread surfaces convex in cross-section for contacting the lower face of the belt, said intermediate rollers being of larger diameter than said marginal rollers, and the treads of the rollers of the set collectively presenting a convex support transversely of the belt for supporting the return reach of the belt in reversely troughed condition.

CHARLES W. STAACKE.

REFERENCES CITED

The following references are of record in the file of this patent:

UNITED STATES PATENTS

| Number | Name | Date |
| --- | --- | --- |
| 714,812 | Mann et al. | Dec. 2, 1902 |
| 1,773,621 | Hopkinson | Aug. 19, 1930 |
| 2,052,900 | Searles et al. | Sept. 1, 1936 |